United States Patent
Pedersen et al.

(10) Patent No.: US 7,643,448 B2
(45) Date of Patent: Jan. 5, 2010

(54) TRANSPORT FORMAT DATA TRANSMISSION

(75) Inventors: Kent Pedersen, Frederiksberg (DK); Benoist Sebire, Beijing (CN)

(73) Assignee: Nokia Corporation, Espoo (FI)

( * ) Notice: Subject to any disclaimer, the term of this patent is extended or adjusted under 35 U.S.C. 154(b) by 668 days.

(21) Appl. No.: 10/534,102

(22) PCT Filed: Nov. 7, 2002

(86) PCT No.: PCT/EP02/12426

§ 371 (c)(1),
(2), (4) Date: Jan. 17, 2006

(87) PCT Pub. No.: WO2004/042987

PCT Pub. Date: May 21, 2004

(65) Prior Publication Data

US 2006/0176976 A1    Aug. 10, 2006

(51) Int. Cl.
*H04W 4/00* (2009.01)
(52) U.S. Cl. .................. 370/329; 370/342; 370/345; 370/337; 455/450; 455/451
(58) Field of Classification Search .............. 370/335, 370/342; 455/452.2, 450, 451; 375/246
See application file for complete search history.

(56) References Cited

U.S. PATENT DOCUMENTS

2003/0072290 A1* 4/2003 Hwang et al. ............... 370/342

FOREIGN PATENT DOCUMENTS

| EP | 1 009 174 A2 | 6/2000 |
|---|---|---|
| EP | 1 009 174 A3 | 5/2001 |
| EP | 1102440 A2 | 5/2001 |
| WO | WO 01/17283 A2 | 3/2001 |
| WO | WO-01/97394 A1 | 12/2001 |
| WO | WO 02/093817 A1 | 11/2002 |

* cited by examiner

*Primary Examiner*—Nick Corsaro
*Assistant Examiner*—Vladimir Magloire
(74) *Attorney, Agent, or Firm*—Harrington & Smith, PC

(57) ABSTRACT

In a flexible layer one (403) of a GERAN transmitter device, a TFCI, which indicates a particular combination of cyclic redundancy check, channel coding and rate matching, is generated by a TFCI generating process (412) using information from the medium access control layer. The TFCI is coded by a coding process (413), and inserted into the data stream by a TFCI insertion process (414). Each code has more bits than the corresponding TFCI, and identifies uniquely the TFCI. The coded TFCI is spread across the pre-interleaved block with portions placed in fixed positions in each burst. Interleaving is then performed by an interleaver (411). The coded TFCI used with a half-rate channel is the central segment of the coded TFCI used in the corresponding full-rate channel. The additional loss is so small as to be insignificant, but the FER performance is significantly improved, compared to using the full-rate codes, as a result of the increased payload of the content data bits. In half-rate mode, the amount of coded TFCI data gives rise to a ratio of the performance of the coding of the transport format combination data to the performance of the coded content data which is at a similar level to the ratio in the full-rate mode.

12 Claims, 7 Drawing Sheets

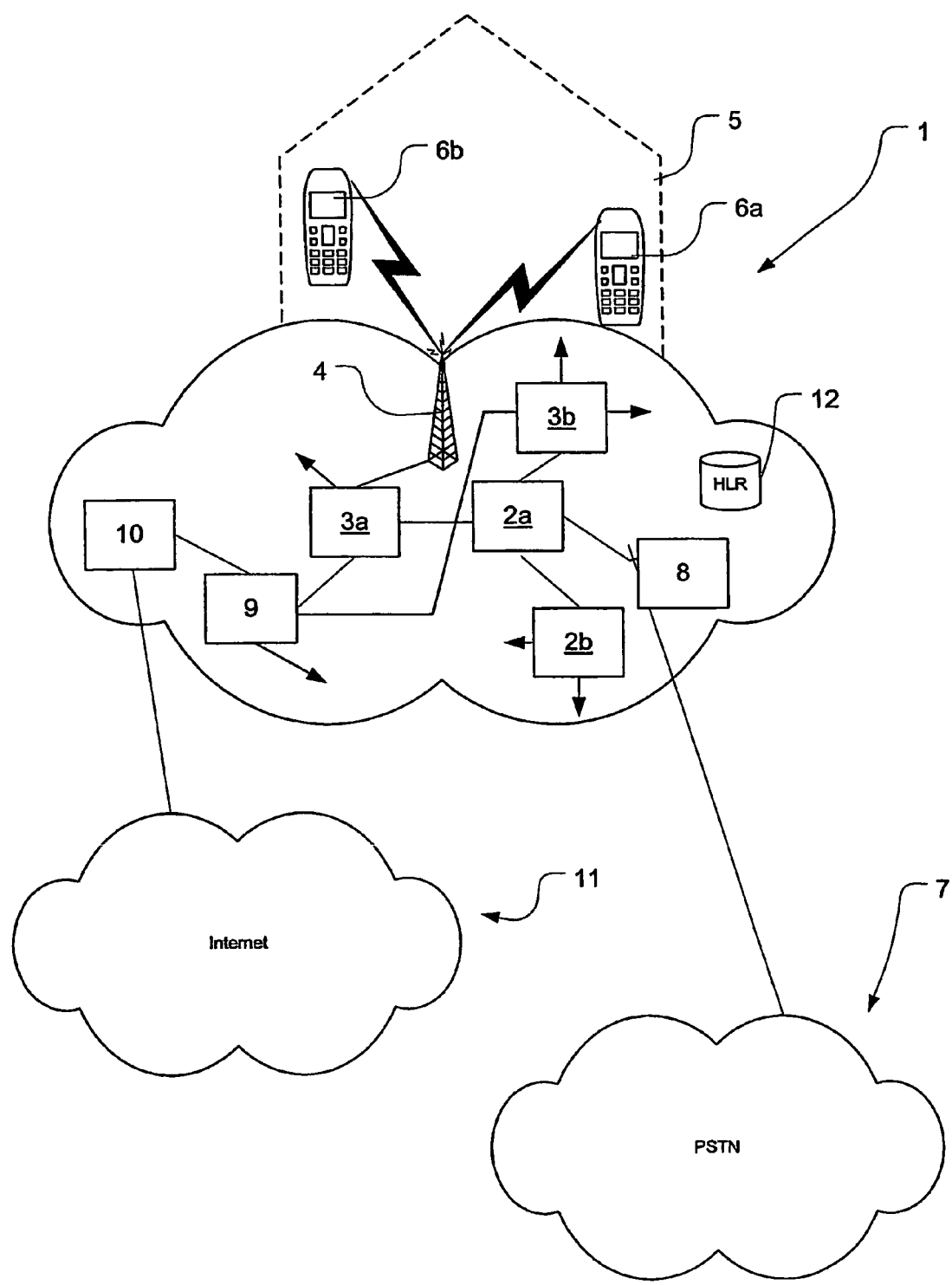

TRANSPORT FORMAT DATA TRANSMISSION

FIELD OF THE INVENTION

The present invention relates to a radio transmitter device including a flexible layer one, and to a method of operating a radio transmitter including a flexible layer one. The invention relates also to a mobile device, and to a base transceiver station.

BACKGROUND TO THE INVENTION

In GERAN (GSM/EDGE Radio Area Network) Iu mode at present, the MAC (medium access control layer is responsible for the mapping between the logical channels (traffic or control channels) and the basic physical subchannels (Dedicated Basic Physical SubCHannel or Shared Basic Physical SubCHannel). The logical channels are the channels the physical layer offers to the MAC layer. These logical channels and the mapping to the basic physical subchannels are fully specified in GSM/EDGE standards, allowing the functionality in the MAC layer to be relatively simple.

A different approach is taken in UTRAN (UTMS Terrestrial Radio Access Network) where, instead of providing logical channels, the physical layer offers Transport Channels (TrCH), which can be used by the MAC layer. A transport channel can be used to transmit one flow over the air interface. A number of transport channels can be active at the same time and are multiplexed at the physical layer. The transport channels are configured at call set-up by the network.

The concept of transport channels is proposed to be used in GERAN. Each of these transport channels can carry one flow having a certain Quality of Service (QoS). A number of transport channels can be multiplexed and sent on the same dedicated physical subchannel thereby making it possible to have different protection on different classes of bits, for instance. The configuration used on a transport channel i.e. the number of bits, coding, interleaving etc. is denoted the Transport format combination (TF). As in UTRAN, a number of transport format combinations can be associated with one transport channel. For instance, in adaptive multirate encoding (AMR), the class $1a$ bits have their own TrCH, with one transport format combination configured per AMR mode. The configuration of the transport format combinations can be controlled by the network and signalled to the mobile on call set-up. In both the mobile and the BTS, the transport format combinations can be used to configure the encoder and decoder units. When configuring a transport format combination, the network can choose between a number of pre-defined CRC (cyclic redundancy check) lengths and code types. For each of the transport channels, a given number of transport format combinations can be configured on call set-up.

Transport blocks (TB) are proposed to be exchanged between the MAC layer and the physical layer on a transport time interval (TTI) basis (e.g. 20 ms). For each transport block a transport format combination is chosen and indicated through the transport format combination indicator (TFI). In other words, the TFI tells which channel coding to use for that particular transport block on that particular TrCH during the TTI.

Only some combinations of the transport format combinations of the different TrCH are allowed. A valid combination is called a Transport Format Combination (TFC). When transport format combinations are combined in a TFC the sum of the output bits adds up to the total number of available bits in a radio packet on the basic physical sub-channel e.g. 464 bits for Gaussian minimum shift keying (GMSK) full-rate channels. The set of valid TFCs on a physical sub-channel is called the Transport Format Combination Set (TFCS).

In order to decode a received sequence, the receiver needs to know the active TFC for a radio packet. This information is transmitted in the Transport Format Combination Indicator (TFCI) field. This field is a layer 1 header, and has the same function as the stealing bits commonly used at present. Each of the TFC within a TFCS is assigned a unique TFCI value, which is the first thing to be decoded by the receiver when a radio packet is received. From the decoded TFCI value, the transport format combinations for the different transport channels can be found, allowing decoding to start.

FIG. 1A shows a proposed architecture for a GERAN flexible layer one. Although it is inspired by the architecture that was standardised for the UL in UTRAN, it is significantly more simple.

Referring to FIG. 1A, a physical layer includes the following processes in sequence in respect of each TrCH provided by a layer two above: CRC attachment, channel coding, radio segment equalisation, first interleaving, segmentation, rate matching, transport channel multiplexing, TFCI mapping and second interleaving. In the CRC attachment step, error detection is provided on each transport block through a CRC. The size of the CRC to be used is fixed on each TrCH and is configured by a radio resource layer (RRC) higher than the layer one, and is a semi-static attribute of the transport format combination. The entire transport block is used to calculate the parity bits. Code blocks are output from the CRC attachment process.

Code blocks are then processed by the channel coding process, producing encoded blocks. The channel coding to be used is chosen by the RRC and can only be changed through higher layer signalling. The channel coding used is a semi-static attribute of the transport format combination, although in practise it will probably be fixed for each TrCH. Thus, for AMR, the same channel coding is used for all the modes, and rate matching simply adjusts the code rate by puncturing or repetition. In the radio segment equalisation step, radio segment size equalisation adjusts (by padding) the input bit sequence to ensure that the encoded block can be segmented into $S_i$ data segments of same size. The first interleaver is a simple block interleaver with inter-column permutation. Its task is to ensure that no consecutive coded bits are transmitted in the same radio packet.

When the TTI is longer than the radio packet duration, the input bit sequence is segmented by the segmentation process, and each $S_i$ radio segment is mapped onto one radio packet ($S_i$=Transmission time/radio packet duration). As a result, the input bit sequence is mapped onto $S_i$ consecutive radio packets.

The three last described processes (equalisation, first interleaving and segmentation) are only used when the TTI is longer than the radio packet duration, and are transparent otherwise. For each encoded block, they produce $S_i$ radio segments.

The rate matching process is the core of the flexible layer one. It causes bits of a radio segment on a transport channel to be repeated or punctured. Layers above the layer one assign a rate matching attribute for each transport channel. This attribute is semi-static and can only be changed through higher layer signalling. Once the number of bits to be repeated or removed is calculated, rate-matching attribute can begin. The higher the value of the attribute, the more important the bits (more repetition/less puncturing). Since the block size is a dynamic attribute, the number of bits on a transport channel can vary between different transmission times. When this happens, bits are repeated or punctured to ensure that the total bit rate after TrCH multiplexing is identical to the total channel bit rate of the allocated dedicated physical channels. Data output from the rate matching process is termed a radio frame. For every radio packet to be transmitted, the rate matching produces one radio frame per radio segment, e.g. per TrCH.

In the TrCH multiplexing step, one radio frame from each TrCH is delivered to the TrCH multiplexing, for every radio packet to be transmitted, according to the TFC. These radio frames are serially multiplexed into a coded composite transport channel (CCTrCH). For every radio packet to be transmitted, the coded TFCI is attached at the beginning of the CCTrCH by the TFCI mapping process before interleaving. The coded TFCI and the CCTrCH are interleaved together by the second interleaving step on radio blocks. The interleaving can be either diagonal or block rectangular, and is configured on call set-up.

An alternative architecture is shown in FIG. 1B. Here, the radio segment equalisation, first interleaving and segmentation processes of the FIG. 1A architecture are omitted.

SUMMARY OF THE INVENTION

According to a first aspect of the present invention, there is provided a radio transmitter device in which data indicating a transport format combination is coded and combined with content data for incorporation in a radio packet, the device being operable to include in a radio packet for a full-rate channel a code selected from a set which relates transport format combination data to codes, the codes having more bits than and identifying the corresponding transport format combination data, and operable in a mode in which data is transmitted on a channel at a lesser rate than in the full-rate channel to include in a radio packet coded transport format combination data constituting a part less than the whole of a code selected from the set of codes.

According to a second aspect of the invention, there is provided a radio transmitter device in which data indicating a transport format combination is coded and combined with content data for incorporation in a radio packet, the device being operable to include in a radio packet for a full-rate channel an amount of coded transport format combination data which gives rise to a particular ratio of the performance of the coding of the transport format combination data to the performance of the coded content data, and operable in a mode in which data is transmitted on a channel at a lesser rate than on a full-rate channel to include in a radio packet an amount of coded transport format combination data which gives rise to a ratio of the performance of the coding of the transport format combination data to the performance of the coded content data which is at a similar level to the ratio in the full-rate channel.

The transmitter device of the above aspects preferably includes a flexible layer one. The term 'flexible layer one' will be understood to mean a physical layer which can support plural active independently-configurable transport channels simultaneously. The device of these aspects of the invention preferably comprises an interleaver for interleaving the coded transport format combination data with the coded content data. The radio transmitter device may be included in a mobile telephone or in a base transceiver station, for example.

According to a third aspect of the invention, there is provided a method of operating a radio transmitter in which data indicating a transport format combination is coded and combined with content data for incorporation in a radio packet, the method comprising including in a radio packet for a full-rate channel a code selected from a set which relates transport format combination data to codes, the codes having more bits than and identifying the corresponding transport format combination data, and, in a mode in which data is transmitted on a channel at a lesser rate than in the full-rate channel, including in a radio packet coded transport format combination data constituting a part less than the whole of a code selected from the set of codes.

According to a fourth aspect of the invention, there is provided a method of operating a radio transmitter in which data indicating a transport format combination is coded and combined with content data for incorporation in a radio packet, the method comprising: including in a radio packet for a full-rate channel an amount of coded transport format combination data which gives rise to a particular ratio of the performance of the coding of the transport format combination data to the performance of the coded content data, and, in a mode in which data is transmitted on a channel at a lesser rate than on a full-rate channel, including in a radio packet an amount of coded transport format combination data which gives rise to a ratio of the performance of the coding of the transport format combination data to the performance of the coded content data which is at a similar level to the ratio in the full-rate channel.

Preferably, the ratios are substantially the same.

An advantage of the above aspects of the invention is that, compared to the prior art, more content data can be transmitted per radio packet on less than full-rate channels without any significant decrease in transmission reliability performance.

In any of these aspects of the invention, the coded transport format combination data in the lesser-rate mode may comprise a number of bits equal to or substantially equal to the number of bits in the full-rate code multiplied by the ratio of the bit rate of the lesser-rate channel to the full-rate channel. Also, the coded transport format combination data for the lesser-rate channel may form a central segment of a code selected from the set. These features are particularly useful when codes having certain suitable properties are used, since it can provide a good balance between the strength of decoding of the transport format combination data and the amount of content data that can be transmitted. The codes proposed for use in GERAN TFCIs are particularly suitable.

The invention has particular application to GERAN, in Iu mode and in other modes. However, the invention is more broadly applicable than the GERAN application described in the embodiments.

BRIEF DESCRIPTION OF THE DRAWINGS

FIG. 2 shows a mobile communication system incorporating components according to the present invention;

DETAILED DESCRIPTION OF THE PREFERRED EMBODIMENT

Figure 1A:
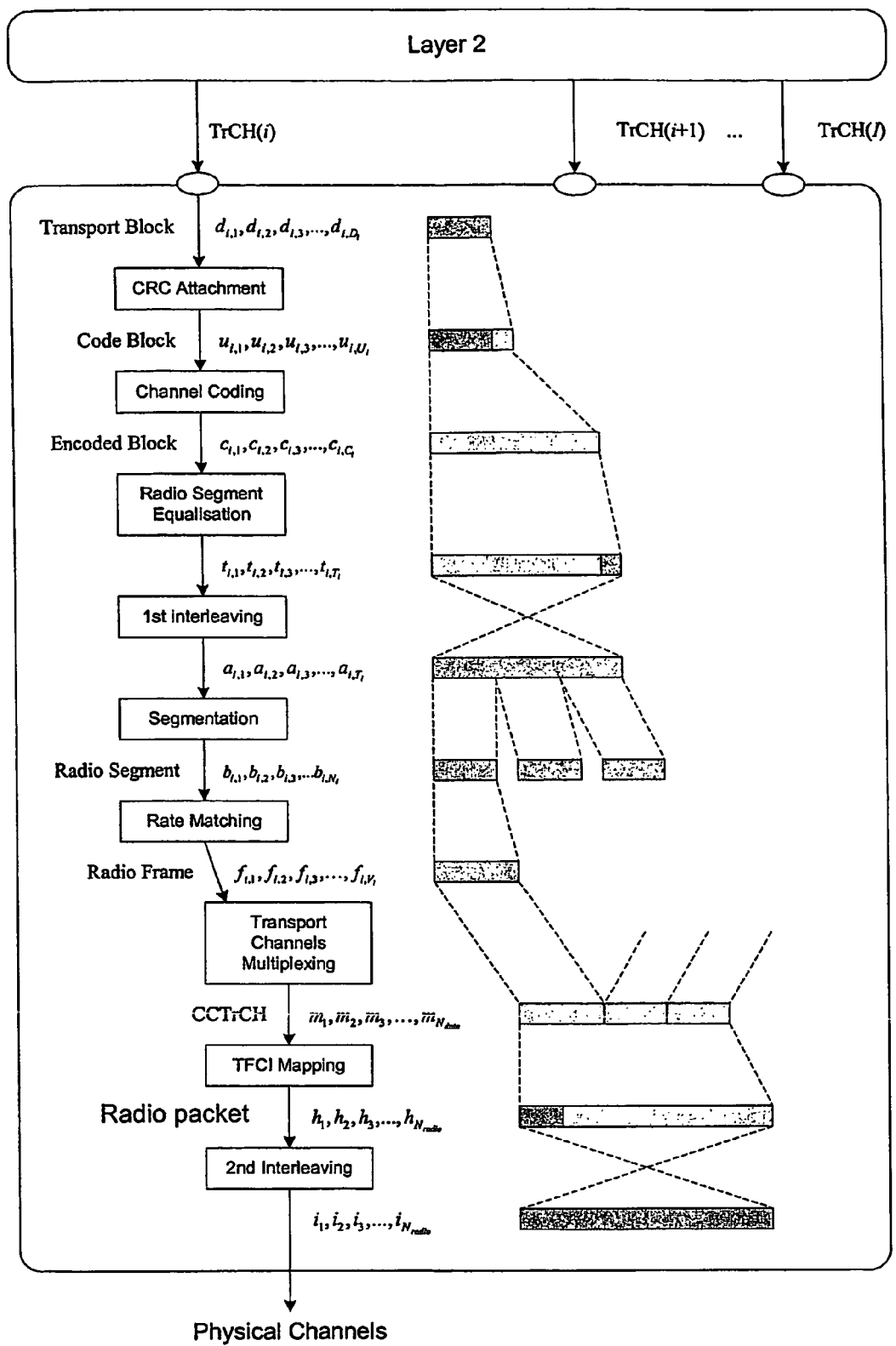
FIGS. 1A and 1B show alternative physical layer or flexible layer one architectures proposed for use in GERAN.

Preferred embodiments of the present invention will now be described, by way of example only, with reference to the accompanying drawings.

Referring to FIG. 2, a mobile phone network 1 comprises a plurality of switching centres including first and second switching centres 2a, 2b. The first switching centre 2a is connected to a plurality of base station controllers including first and second base station controllers 3a, 3b. The second switching centre 2b is similarly connected to a plurality of base station controllers (not shown).

The first base station controller 3a is connected to and controls a base transceiver station 4 and a plurality of other base transceiver stations. The second base station controller 3b is similarly connected to and controls a plurality of base transceiver stations (not shown).

In the present example, each base transceiver station services a respective cell. Thus, the base transceiver station 4 services a cell 5. Alternatively, a plurality of cells could be serviced by one base transceiver station by means of directional antennas. A plurality of mobile stations 6a, 6b are located in the cell 5. The number and identities of mobile stations in any given cell varies with time.

The mobile phone network 1 is connected to a public switched telephone network 7 by a gateway switching centre 8.

A packet service aspect of the network includes a plurality of packet service support nodes (one shown) 9 which are connected to respective pluralities of base station controllers 3a, 3b. At least one packet service support gateway node 10 connects the or each packet service support node 10 to the Internet 11.

The switching centres 3a, 3b and the packet service support nodes 9 have access to a home location register 12.

Communication between the mobile stations 6a, 6b and the base transceiver station 4 employs a time-division multiple access (TDMA) scheme.

Figure 3:
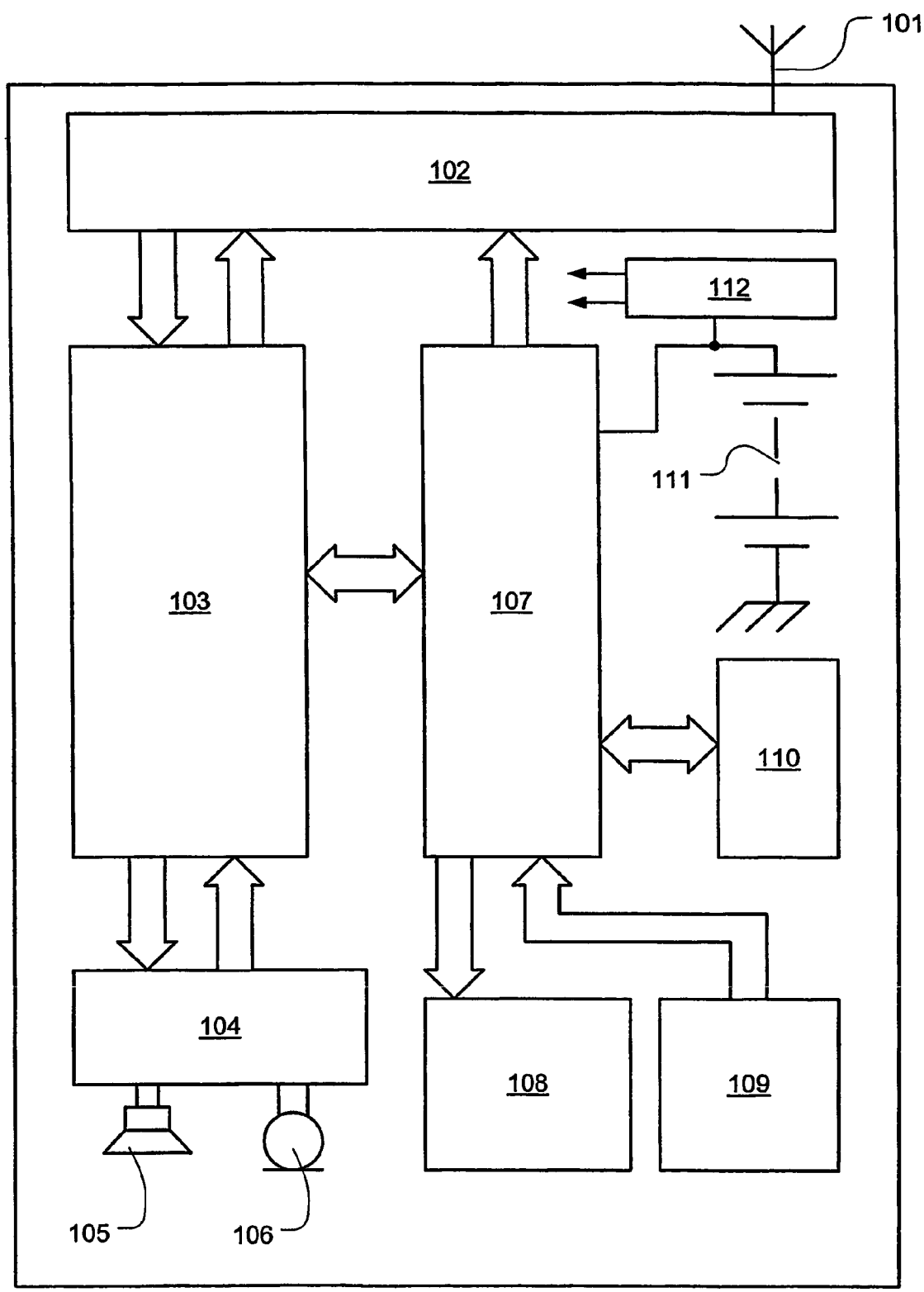
FIG. 3 is a block diagram of a mobile station of the FIG. 1 system.

Referring to FIG. 3, the first mobile station 6a comprises an antenna 101, an rf subsystem 102, a baseband DSP (digital signal processing) subsystem 103, an analogue audio subsystem 104, a loudspeaker 105, a microphone 106, a controller 107, a liquid crystal display 108, a keypad 109, memory 110, a battery 111 and a power supply circuit 112.

The rf subsystem 102 contains if and rf circuits of the mobile telephone's transmitter and receiver and a frequency synthesizer for tuning the mobile station's transmitter and receiver. The antenna 101 is coupled to the rf subsystem 102 for the reception and transmission of radio waves.

The baseband DSP subsystem 103 is coupled to the rf subsystem 102 for receiving baseband signals therefrom and for sending baseband modulation signals thereto. The baseband DSP subsystems 103 includes codec functions which are well-known in the art.

The analogue audio subsystem 104 is coupled to the baseband DSP subsystem 103 and receives demodulated audio therefrom. The analogue audio subsystem 104 amplifies the demodulated audio and applies it to the loudspeaker 105. Acoustic signals, detected by the microphone 106, are pre-amplified by the analogue audio subsystem 104 and sent to the baseband DSP subsystem 4 for coding.

The controller 107 controls the operation of the mobile telephone. It is coupled to the rf subsystem 102 for supplying tuning instructions to the frequency synthesizer and to the baseband DSP subsystem 103 for supplying control data and management data for transmission. The controller 107 operates according to a program stored in the memory 110. The memory 110 is shown separately from the controller 107. However, it may be integrated with the controller 107.

The display device 108 is connected to the controller 107 for receiving control data and the keypad 109 is connected to the controller 107 for supplying user input data signals thereto.

The battery 111 is connected to the power supply circuit 112 which provides regulated power at the various voltages used by the components of the mobile telephone.

The controller 107 is programmed to control the mobile station for speech and data communication and with application programs, e.g. a WAP browser, which make use of the mobile station's data communication capabilities.

The second mobile station 6b is similarly configured.

Figure 4:
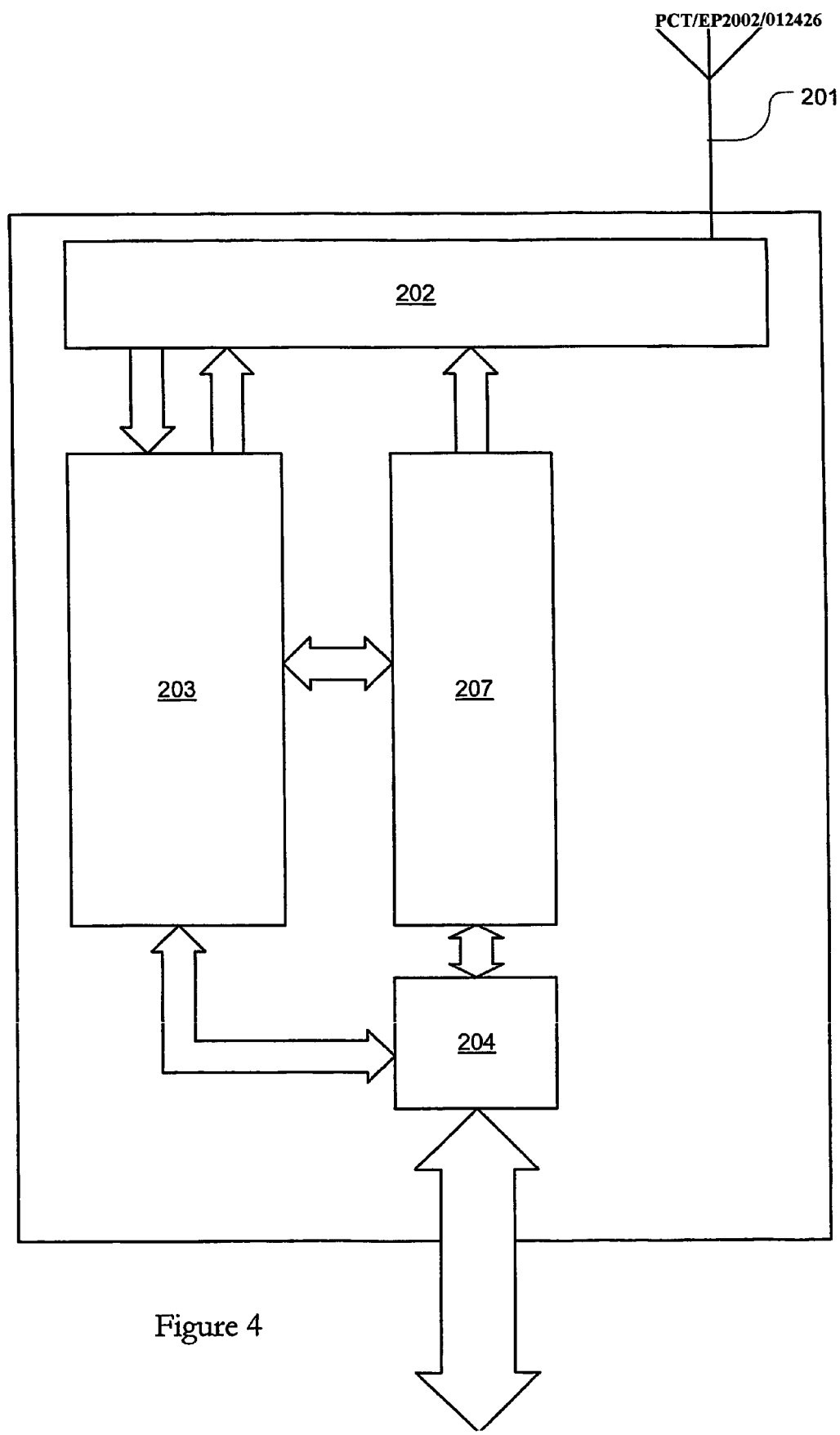
FIG. 4 is a block diagram of a base transceiver station of the FIG. 1 system.

Referring to FIG. 4, greatly simplified, the base transceiver station 4 comprises an antenna 201, an rf subsystem 202, a baseband DSP (digital signal processing) subsystem 203, a base station controller interface 204 and a controller 207.

The rf subsystem 202 contains the if and rf circuits of the base transceiver station's transmitter and receiver and a frequency synthesizer for tuning the base transceiver station's transmitter and receiver. The antenna 201 is coupled to the rf subsystem 202 for the reception and transmission of radio waves.

The baseband DSP subsystem 203 is coupled to the rf subsystem 202 to receive baseband signals therefrom and for sending baseband modulation signals thereto. The baseband DSP subsystems 203 includes codec functions which are well-known in the art.

The base station controller interface 204 interfaces the base transceiver station 4 to its controlling base station controller 3a.

The controller 207 controls the operation of the base transceiver station 4. It is coupled to the rf subsystem 202 for supplying tuning instructions to the frequency synthesizer and to the baseband DSP subsystem for supplying control data and management data for transmission. The controller 207 operates according to a program stored in the memory 210.

When used for circuit-switched speech traffic, the channelisation scheme is as employed in GSM.

The baseband DSP subsystems 103, 203 and controllers 107, 207 of the mobile stations 6a, 6b and the base transceiver stations 4 are configured to implement two protocol stacks. The first protocol stack is for circuit switched traffic and is substantially the same as employed in conventional GSM systems. The second protocol stack is for packet switched traffic.

Figure 5:
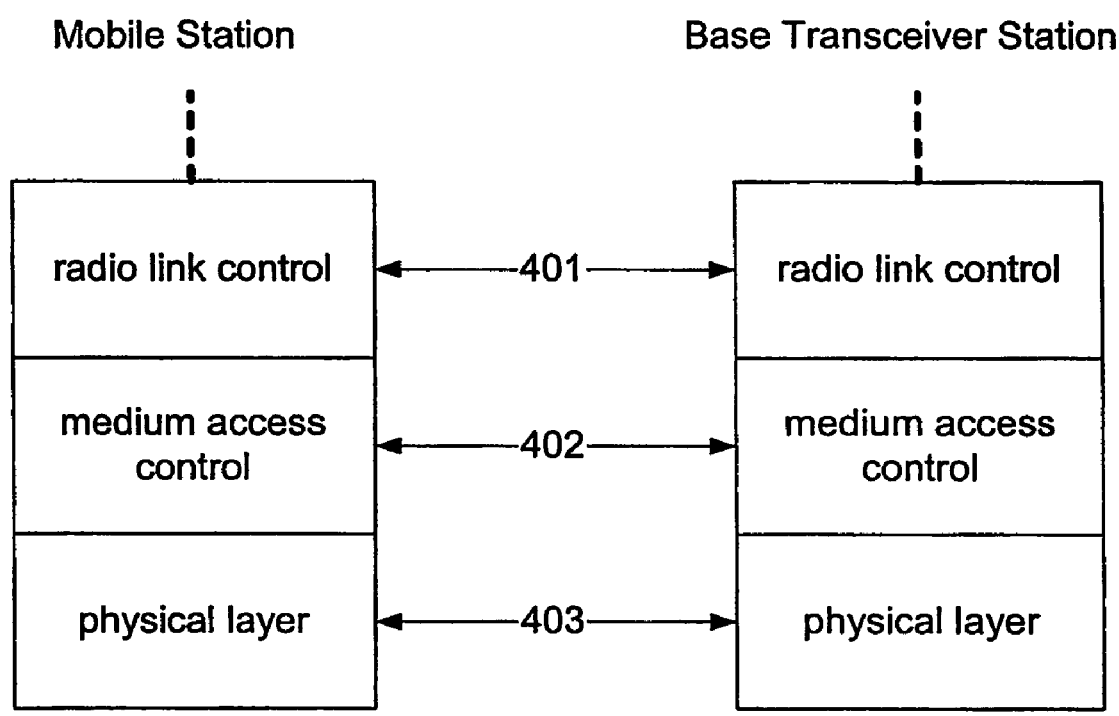
FIG. 5 illustrates the lower levels of a protocol stack used in an embodiment of the present invention.

Referring to FIG. 5, the layers relevant to the radio link between a mobile station 6a, 6b and a base station controller 4 are the radio link control (RLC) layer 401, the medium access control (AC) layer 402 and the physical layer or flexible layer one (FLO) 403. Other layers exist above the shown layers, but these are not shown for clarity.

The radio link control layer 401 has two modes: transparent and non-transparent. In transparent mode, data is merely passed up or down through the radio link control layer without modification.

In non-transparent mode, the radio link control layer 401 provides link adaptation and constructs data blocks from data units received from higher levels by segmenting or concatenating the data units as necessary and performs the reciprocal process for data being passed up the stack. It is also responsible for detecting lost data blocks or reordering data block for upward transfer of their contents, depending on whether acknowledged mode is being used. This layer may also provide backward error correction in acknowledged mode.

The medium access control layer 402 is responsible for allocating data blocks from the radio link control layer 401 to appropriate transport channels and passing received radio packets from transport channels to the radio link control layer 401.

The physical layer 403 is responsible for creating transmitted radio signals from the data passing through the transport channels, and for passing received data up through the correct transport channel to the medium access control layer 402. The physical layer 403 includes the architecture shown in FIG. 1.

Figure 6:
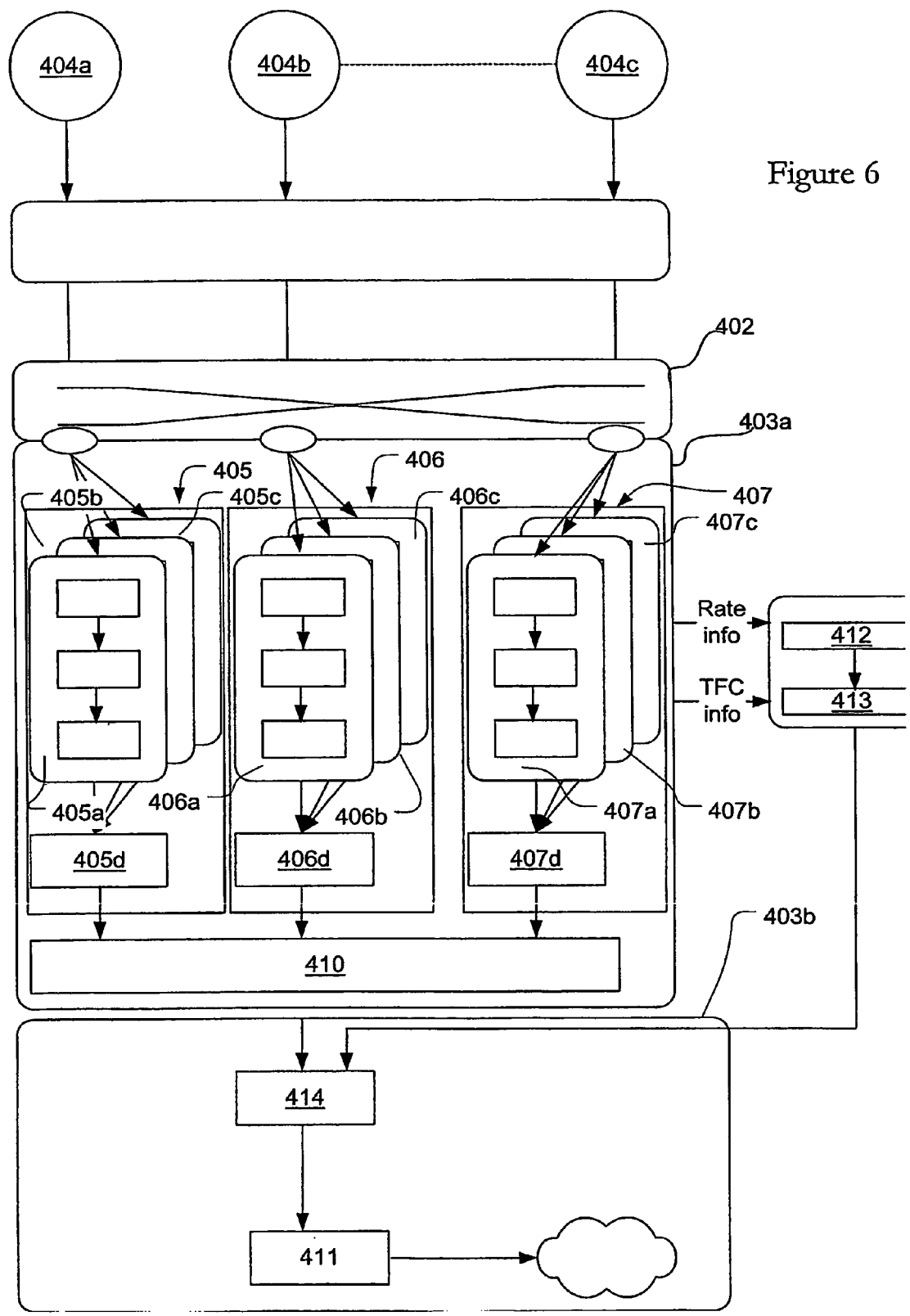
FIG. 6 illustrates the generation of a radio signal by a transmitter and method according to the present invention.

Referring to FIG. 6, data produced by applications 404a, 404b, 404c propagates down the protocol stack to the physical layer 403a, 403b. The physical layer 403a, 403b carries data from the applications 404a, 404b, 404c on different transport channels 405, 406, 407 according to the class to which the data belongs. Each transport channel 405, 406, 407 can be configured to process signals according to a plurality of processing schemes 405a, 405b, 405c, 406a, 406b, 406c, 407a, 407b, 407c. The configuration of the transport channels 405, 406, 407 is established during call set-up on the basis of the capabilities of the mobile station 6a, 6b and the network and the nature of the application or applications 404a, 404b, 404c being run.

Figure 1B:
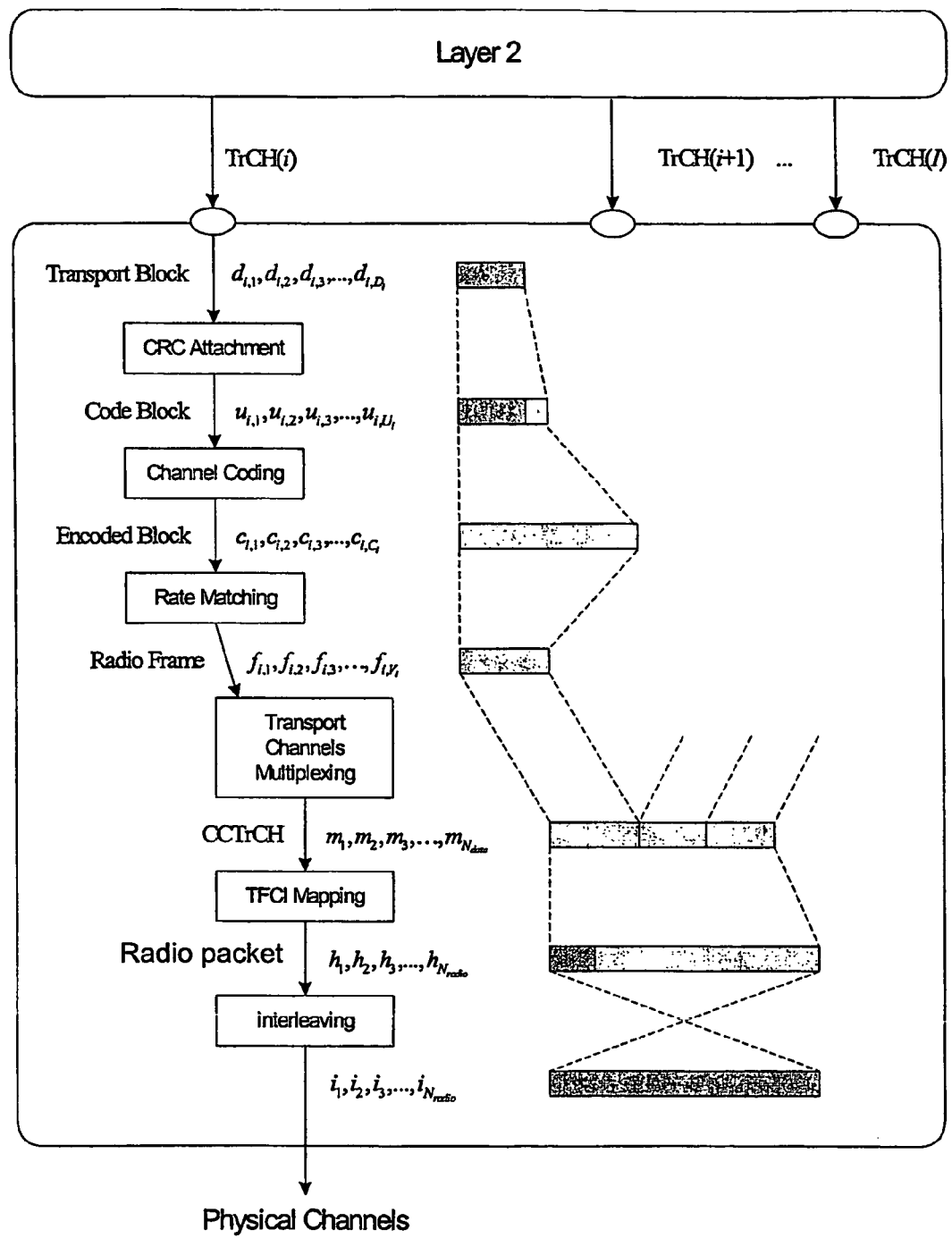

The processing schemes 405a, 405b, 405c, 406a, 406b, 406c, 407a, 407b, 407c are unique combinations of cyclic redundancy check 405a, 406a, 407a, channel coding 405b, 406b, 407b and rate matching 405c, 406c, 407c. These unique processing schemes are the TFCs referred to above. The other processing steps shown in the physical layer of FIG. 1 are omitted from FIG. 6 for clarity. Steps 405d, 406d and 407d are optional interleaving steps, which are omitted from FIG. 1.

The combined data rate produced for the transport channels 405, 406, 407 must not exceed that of physical channel or channels allocated to the mobile station 6a, 6b. This places a limit on the transport format combinations that can be permitted. For instance, if there are three transport formats TF1, TF2, TF3 for each transport channel, the following combinations might be valid and thus constitute TFCIs:—

TF1 TF1 TF2
TF1 TF3 TF3 but the following combinations might not be valid and thus not constitute TFCIs:—

TF1 TF2 TF2
TF1 TF1 TF3

The data output by the transport channel interleaving processes are multiplexed by a multiplexing process 410 and then subject to further interleaving 411.

A TFCI is generated by a TFCI generating process 412 from information from the medium access control layer and coded by a coding process 413. The coded TFCI is attached to the beginning of the data stream by a TFCI insertion process. Interleaving is then performed by an interleaver 411. The coded TFCI is not subject to variable interleaving, allowing it to be readily located by the receiving station. Accordingly, a receiver can de-interleave the signal, identify and decode the coded TCFI, and use the decoded TFCI to separate and decode the transport channels.

The TFCI codes proposed for GMSK full-rate channels are: 1 bit TFCI coded to 8 bits, 2 bits TFCI coded to 16 bits, 3 bits TFCI coded to 24 bits, 4 bits TFCI coded to 28 bits, and 5 bits TFCI coded to 36 bits. Each TFCI is related to one-to-one to a code, as shown in tables 2 to 6 below. It is the code (also termed coded TFCI) which is distributed over the block before interleaving. The code is selected from the group of codes shown in the tables. As will be appreciated, each code has more bits than the corresponding TFCI, and identifies uniquely the TFCI.

The amount of coded transport format combination data (the coded TFCI) gives rise to a particular ratio of the performance of the coding of the transport format combination data to the performance of the coded content data. The ratio is preferred to be greater than unity, since this implies the coding used to code the TFCI is stronger than the coding used to code the content data. The ratio of the performance of the coded TFCI data to the performance of the coded content data resulting from this arrangement is measurable using any suitable simulator. The performance may be measured in terms of block error rate or frame erasure rate, for example. It is preferred that the frame erasure rate including TFCI errors is no more than 1 dB greater than the frame erasure rate without the TFCI. Preferably, the frame erasure rate is not more than 0.5 dB greater than without the TFCI. A performance decrease of 0.5 dB could be considered to be acceptable in view of the extra data content that can be transmitted over the channel.

Half-rate (HR) channels are allowed for by the flexible layer one 403. For a given amount of content data, the coding rate is one-half the strength of the coding rate of the full-rate channels, or nearly one-half the strength (for example 0.52 or 0.48 times the strength).

The inventors have performed tests with a half-rate channel using a data packet size of 100 bits, which with a block transmission interval of 20 ms results in a 5 kbit/s channel. In these tests, each data block was processed through a six bit CRC, and a one-third rate mothercode used with a carrier frequency of 900 MHz. The coded TFCI was inserted before interleaving the data using a diagonal interleaving over four bursts. The result of this interleaving was a distribution of the bits of the coded TFCI reordered over four packets, using the even numbered position of the first two blocks and the odd positions of the last two blocks. Testing was carried out for each of the possible coded TFCI lengths, each test involving the processing of 20.000 blocks. The results of the tests are summarised in Table 1. Here, two kinds of frame erasure rate (FER) are compared; one where the FER is evaluated using the CRC on the data block, and one where the errors originating from a wrongly decoded TFCI is included. The link level performance when applying these codes on an FLO half-rate channel, on which the summary is made, was evaluated through simulations on TU3iFH.

TABLE 1

| TFCI Code | TFCI Error Rate | FER | FER + TFCI Error | Triggered Loss in dB |
|---|---|---|---|---|
| TFCI 1-8 | 2.30 | 10.59 | 10.59 | 0.0 |
| TFCI 2-16 | 2.30 | 10.59 | 10.59 | 0.0 |
| TFCI 3-24 | 2.28 | 11.03 | 11.03 | 0.0 |
| TFCI 4-28 | 3.08 | 11.17 | 11.17 | 0.0 |
| TFCI 5-36 | 2.93 | 12.01 | 12.01 | 0.0 |

The rightmost column of Table 1 shows the loss in dB originating from wrongly decoded TFCIs. As seen from the table, there is no loss for any of the code rates, and thus the performance could be considered satisfactory. However, when looking at the TFCI Error Rate compared to the FER a difference in performance of approximately 8 dB is observed for all codes. This indicates that the effective code rate of the TFCI is significantly larger than that of the data block. The invention results in part from this observation. By reducing the coding on the TFCI, bits of the half-rate channel may be freed for content data.

According to the invention, the codewords used for the full-rate channels are reduced in length by a factor of two, and the shorter codes applied to the half-rate channels. Also, the coded transport format combination data used for half-rate channels is a part of the corresponding coded TFCI used for full-rate channels. The inventors have found that using the middle segment of each codeword provides the best performance, because of the properties of the codes. Accordingly, the coded TFCI used with a half-rate channel is the central segment of the coded TFCI used in the corresponding full-rate channel. The code supplied for interleaving is provided by the coding process 413 on the basis of channel rate and TF information.

The codes used in half-rate channels are illustrated in Tables 2 to 6 below. In these tables, the TFCI is given in the leftmost column, and the coded TFCI for full-rate channels is given in the rightmost column, with the bits used for half-rate channels forming the middle segment of the full-rate codes. The codewords for the 1 bit TFCI consist of the bits from 3 to 6 of the full-rate GMSK codewords, as shown in Table 2.

TABLE 2

| bit | 1 2 | 3 4 5 6 | 7 8 |
|---|---|---|---|
| 0 | 1, 1, | 1, 1, 1, 1, | 1, 1 |
| 1 | 0, 0, | 0, 0, 0, 0, | 0, 0 |

For a TFCI of length two bits for full-rate channels, bits five to twelve are used for half-rate channels as shown in Table 3:

TABLE 3

| Bit | 1 2 3 4 | 5 6 7 8 9 10 ... 12 | 13 ... 16 |
|---|---|---|---|
| 0, 0 | 1, 1, 1, 1 | 1, 1, 1, 1, 1, 1, 1, | 1, 1, 1, 1 |
| 0, 1 | 1, 0, 0, 1 | 0, 0, 1, 0, 0, 1, 0, 0, | 1, 0, 0, 1 |
| 1, 0 | 0, 1, 0, 0 | 1, 0, 0, 1, 0, 0, 1, 0, | 0, 1, 0, 0 |
| 1, 1 | 0, 0, 1, 0 | 0, 1, 0, 0, 1, 0, 0, 1, | 0, 0, 1, 0 |

For a TFCI of length three bits for full-rate channels, bits seven to eighteen are used for half-rate channels, as shown in table 4:

TABLE 4

| bit | 1 2 3 4 5 6 | 7 8 ... ... 18 | 19 ... ... 24 |
|---|---|---|---|
| 0, 0, 0 | 1, 1, 1, 1, 1, 1, | 1, 1, 1, 1, 1, 1, 1, 1, 1, 1, 1, 1, | 1, 1, 1, 1, 1, 1 |
| 0, 0, 1 | 1, 1, 1, 0, 0, 0, | 0, 1, 1, 1, 0, 0, 0, 0, 1, 1, 1, 0, | 0, 0, 0, 1, 1, 1 |
| 0, 1, 0 | 1, 0, 0, 1, 1, 0, | 0, 1, 0, 0, 1, 1, 0, 0, 1, 0, 0, 1, | 1, 0, 0, 1, 0, 0 |
| 0, 1, 1 | 1, 0, 0, 0, 0, 1, | 1, 1, 0, 0, 0, 0, 1, 1, 1, 0, 0, 0, | 0, 1, 1, 1, 0, 0 |
| 1, 0, 0 | 0, 1, 0, 1, 0, 1, | 0, 0, 1, 0, 1, 0, 1, 0, 0, 1, 0, 1, | 0, 1, 0, 0, 1, 0 |
| 1, 0, 1 | 0, 1, 0, 0, 1, 0, | 1, 0, 1, 0, 0, 1, 0, 1, 0, 1, 0, 0, | 1, 0, 1, 0, 1, 0 |
| 1, 1, 0 | 0, 0, 1, 1, 0, 0, | 1, 0, 0, 1, 1, 0, 0, 1, 0, 0, 1, 1, | 0, 0, 1, 0, 0, 1 |
| 1, 1, 1 | 0, 0, 1, 0, 1, 1, | 0, 0, 0, 1, 0, 1, 1, 0, 0, 0, 1, 0, | 1, 1, 0, 0, 0, 1 |

For a TFCI of length four bits for full-rate channels, bits eight to twenty-one are used for half-rate channels, as shown in Table 5:

TABLE 5

| bit | 1 2 3 4 5 6 7 | 8 9 ... ... 21 | 22 ... ... 28 |
|---|---|---|---|
| 0, 0, 0, 0 | 1, 1, 1, 1, 1, 1, 1, | 1, 1, 1, 1, 1, 1, 1, 1, 1, 1, 1, 1, 1, 1, | 1, 1, 1, 1, 1, 1, 1 |
| 0, 0, 0, 1 | 1, 1, 1, 1, 1, 0, 1, | 0, 0, 1, 0, 0, 0, 0, 0, 1, 1, 1, 1, 1, 1, | 1, 0, 0, 0, 0, 0, 0 |
| 0, 0, 1, 0 | 1, 1, 1, 0, 0, 1, 0, | 1, 0, 0, 1, 1, 0, 0, 0, 1, 1, 1, 0, 0, 0, | 0, 1, 1, 1, 1, 0, 0 |
| 0, 0, 1, 1 | 1, 1, 1, 0, 0, 0, 0, | 0, 1, 0, 0, 0, 1, 1, 1, 1, 1, 1, 0, 0, 0, | 0, 0, 0, 0, 0, 1, 1 |
| 0, 1, 0, 0 | 1, 0, 0, 1, 1, 1, 0, | 1, 1, 0, 0, 0, 1, 0, 0, 0, 1, 0, 0, 1, 0, | 0, 1, 1, 0, 0, 1, 1 |
| 0, 1, 0, 1 | 1, 0, 0, 1, 0, 0, 1, | 1, 0, 0, 1, 0, 0, 1, 1, 1, 0, 0, 1, 1, 0, | 0, 0, 0, 1, 1, 0, 0 |
| 0, 1, 1, 0 | 1, 0, 0, 0, 0, 1, 0, 0, | 0, 1, 1, 1, 1, 1, 0, 1, 0, 0, 0, 0, 0, 1, | 1, 1, 1, 0, 0, 0, 0 |
| 0, 1, 1, 1 | 1, 0, 0, 0, 0, 1, 1, | 0, 0, 0, 1, 0, 1, 1, 0, 1, 1, 0, 0, 0, 1, | 1, 0, 0, 1, 1, 1, 1 |
| 1, 0, 0, 0 | 0, 1, 0, 1, 1, 1, 0, | 0, 0, 0, 0, 1, 0, 1, 1, 0, 1, 0, 1, 0, 1, | 0, 1, 0, 1, 0, 1, 0 |
| 1, 0, 0, 1 | 0, 1, 0, 1, 0, 0, 1, | 0, 1, 0, 1, 1, 1, 0, 0, 0, 0, 1, 0, 1, 0, | 0, 0, 1, 0, 1, 0, 1 |
| 1, 0, 1, 0 | 0, 1, 0, 0, 0, 1, 0, 0, | 1, 0, 1, 1, 0, 1, 0, 1, 1, 0, 0, 0, 1, 0, | 1, 1, 0, 1, 0, 0, 1 |
| 1, 0, 1, 1 | 0, 1, 0, 0, 0, 0, 1, 1, | 1, 1, 1, 0, 0, 1, 0, 0, 1, 1, 0, 0, 1, 0, | 1, 0, 1, 0, 1, 1, 0 |
| 1, 1, 0, 0 | 0, 0, 1, 1, 0, 1, 0, | 0, 1, 1, 1, 0, 0, 0, 1, 0, 0, 1, 1, 0, 0, | 1, 1, 0, 0, 1, 1, 0 |
| 1, 1, 0, 1 | 0, 0, 1, 1, 0, 0, 0, | 1, 0, 1, 0, 1, 1, 1, 0, 0, 0, 1, 1, 0, 0, | 1, 0, 1, 1, 0, 0, 1 |
| 1, 1, 1, 0 | 0, 0, 1, 0, 1, 1, 1, | 0, 0, 0, 1, 0, 1, 1, 0, 0, 0, 1, 0, 1, 1, | 0, 1, 0, 0, 1, 0, 1 |
| 1, 1, 1, 1 | 0, 0, 1, 0, 1, 0, 1, | 1, 1, 0, 0, 1, 0, 0, 1, 0, 0, 1, 0, 1, 1, | 0, 0, 1, 1, 0, 1, 0 |

For a TFCI of length five bits for full-rate channels, bits ten to twenty-seven are used for half-rate channels:

TABLE 6

| bit | 1 2 3 4 ... 10 | 11 ... ... ... 27 | 28 ... ... ... 35 |
|---|---|---|---|
| 0, 0, 0, 0, 0 | 0, 0, 0, 0, 0, 0, 0, 0, 0, | 0, 0, 0, 0, 0, 0, 0, 0, 0, 0, 0, 0, 0, 0, 0, 0, 0, | 0, 0, 0, 0, 0, 0, 0, 0 |
| 0, 0, 0, 0, 1 | 0, 0, 0, 0, 1, 0, 1, 0, 1, | 0, 1, 0, 1, 0, 1, 0, 1, 0, 1, 0, 1, 0, 1, 0, 1, 0, 1, | 0, 1, 1, 0, 1, 0, 1, 0, 1 |
| 0, 0, 0, 1, 0 | 0, 0, 0, 0, 1, 0, 1, 0, 0, 1, | 1, 0, 0, 1, 0, 1, 1, 0, 0, 1, 1, 0, 0, 1, 1, 0, 0, 1, | 1, 0, 1, 1, 0, 0, 1, 1, 0 |
| 0, 0, 0, 1, 1 | 0, 0, 0, 1, 1, 1, 1, 0, 0, | 1, 1, 0, 0, 0, 0, 1, 1, 0, 0, 1, 1, 1, 0, 0, 1, 1, 0, 0, | 1, 1, 0, 1, 1, 0, 0, 1, 1 |
| 0, 0, 1, 0, 0 | 0, 0, 1, 0, 0, 1, 1, 1, 1, 0, | 0, 0, 0, 0, 1, 0, 1, 1, 1, 1, 0, 0, 0, 0, 1, 1, 1, 1, 0, | 0, 0, 1, 1, 1, 1, 0, 0, 0 |
| 0, 0, 1, 0, 1 | 0, 0, 1, 0, 1, 1, 0, 1, 1, | 0, 1, 0, 0, 0, 0, 1, 0, 1, 1, 0, 1, 0, 0, 0, 1, 0, 1, 1, | 0, 1, 0, 1, 0, 1, 1, 0, 1 |
| 0, 0, 1, 1, 0 | 0, 0, 1, 1, 0, 0, 0, 1, 1, 1, | 1, 0, 0, 0, 0, 0, 0, 1, 1, 1, 1, 0, 0, 0, 0, 1, 1, 1, | 1, 0, 0, 0, 1, 1, 1, 1, 0 |
| 0, 0, 1, 1, 1 | 0, 0, 1, 1, 1, 0, 0, 0, 1, 0, | 1, 1, 0, 1, 0, 1, 0, 0, 1, 0, 1, 1, 0, 0, 1, 0, | 1, 1, 1, 0, 0, 1, 1, 0, 1, 1 |

TABLE 6-continued

| bit | 1 2 3 4 ... 10 | 11 ... ... ...27 | 28... ... ...35 |
|---|---|---|---|
| 0, 1, 0, 0, 0 | 0, 1, 0, 0, 0, 1, 1, 1, 1, | 1, 1, 1, 0, 1, 0, 0, 0, 0, 0, 0, 1, 0, 0, 0, 0, 0, | 0, 0, 1, 1, 1, 1, 1, 1, 1 |
| 0, 1, 0, 0, 1 | 0, 1, 0, 0, 1, 1, 0, 1, 0, | 1, 0, 1, 1, 1, 1, 0, 1, 0, 0, 1, 1, 1, 0, 1, 0, 1, | 0, 1, 0, 1, 0, 1, 0, 1, 0 |
| 0, 1, 0, 1, 0 | 0, 1, 0, 1, 0, 0, 1, 1, 0, | 0, 1, 1, 1, 1, 1, 1, 0, 0, 1, 1, 0, 1, 1, 1, 0, 0, 1, | 1, 0, 0, 0, 1, 1, 0, 0, 1 |
| 0, 1, 0, 1, 1 | 0, 1, 0, 1, 1, 0, 0, 1, 1, | 0, 0, 1, 0, 1, 0, 1, 1, 0, 0, 1, 1, 1, 0, 1, 1, 0, 0, | 1, 1, 1, 0, 0, 1, 1, 0, 0 |
| 0, 1, 1, 0, 0 | 0, 1, 1, 0, 0, 0, 0, 0, 1, | 1, 1, 1, 1, 1, 1, 1, 1, 1, 0, 0, 0, 1, 1, 1, 1, 1, 0, | 0, 0, 0, 0, 0, 0, 1, 1, 1 |
| 0, 1, 1, 0, 1 | 0, 1, 1, 0, 1, 0, 1, 0, 0, | 1, 0, 1, 0, 1, 0, 1, 0, 1, 1, 0, 1, 1, 0, 1, 0, 1, 1, | 0, 1, 1, 0, 1, 0, 0, 1, 0 |
| 0, 1, 1, 1, 0 | 0, 1, 1, 1, 0, 1, 0, 0, 0, | 0, 1, 1, 0, 1, 0, 0, 1, 1, 1, 1, 0, 1, 0, 0, 1, 1, 1, | 1, 0, 1, 1, 0, 0, 0, 0, 1 |
| 0, 1, 1, 1, 1 | 0, 1, 1, 1, 1, 1, 1, 0, 1, | 0, 0, 1, 1, 1, 1, 0, 0, 1, 0, 1, 1, 1, 0, 0, 1, 0, | 1, 1, 0, 1, 1, 0, 1, 0, 0 |
| 1, 0, 0, 0, 0 | 1, 0, 0, 0, 0, 1, 1, 1, 1, | 1, 1, 1, 1, 0, 0, 0, 0, 0, 0, 0, 0, 1, 1, 1, 1, 1, 1, | 1, 1, 0, 0, 0, 0, 0, 0, 0 |
| 1, 0, 0, 0, 1 | 1, 0, 0, 0, 1, 1, 0, 1, 0, | 1, 0, 1, 0, 0, 1, 0, 1, 0, 1, 0, 1, 1, 0, 1, 0, 1, 0, | 1, 0, 1, 0, 1, 0, 1, 0, 1 |
| 1, 0, 0, 1, 0 | 1, 0, 0, 1, 0, 0, 1, 1, 0, | 0, 1, 1, 0, 0, 1, 1, 0, 0, 1, 1, 0, 1, 0, 1, 0, 1, 0, | 0, 1, 1, 1, 0, 0, 1, 1, 0 |
| 1, 0, 0, 1, 1 | 1, 0, 0, 1, 1, 0, 0, 1, 1, | 0, 0, 1, 1, 0, 0, 1, 1, 0, 0, 1, 1, 1, 0, 0, 1, 1, | 0, 0, 0, 1, 1, 0, 0, 1, 1 |
| 1, 0, 1, 0, 0 | 1, 0, 1, 0, 0, 0, 0, 0, 1, | 1, 1, 1, 0, 0, 1, 1, 1, 1, 0, 0, 0, 1, 0, 0, 0, 0, 1, | 1, 1, 1, 1, 1, 1, 0, 0, 0 |
| 1, 0, 1, 0, 1 | 1, 0, 1, 0, 1, 0, 1, 0, 0, | 1, 0, 1, 1, 0, 0, 0, 1, 0, 1, 1, 0, 1, 1, 0, 1, 0, 0, | 1, 0, 0, 1, 0, 1, 1, 0, 1 |
| 1, 0, 1, 1, 0 | 1, 0, 1, 1, 0, 1, 0, 0, 0, | 0, 1, 1, 1, 0, 0, 0, 1, 1, 1, 1, 0, 1, 1, 1, 0, 0, 0, | 0, 1, 0, 0, 1, 1, 1, 1, 0 |
| 1, 0, 1, 1, 1 | 1, 0, 1, 1, 1, 1, 1, 0, 1, | 0, 0, 1, 0, 0, 1, 0, 0, 1, 0, 1, 1, 1, 0, 1, 1, 0, 1, | 0, 0, 1, 0, 0, 1, 0, 1, 1 |
| 1, 1, 0, 0, 0 | 1, 1, 0, 0, 0, 0, 0, 0, 0, | 0, 0, 0, 1, 1, 0, 0, 0, 0, 0, 0, 0, 0, 1, 1, 1, 1, 1, | 1, 1, 1, 1, 1, 1, 1, 1, 1 |
| 1, 1, 0, 0, 1 | 1, 1, 0, 0, 1, 0, 1, 0, 1, | 0, 1, 0, 0, 1, 1, 0, 1, 0, 1, 0, 1, 0, 0, 1, 0, 1, 0, | 1, 0, 0, 1, 0, 1, 0, 1, 0 |
| 1, 1, 0, 1, 0 | 1, 1, 0, 1, 0, 1, 0, 0, 1, | 1, 0, 0, 0, 1, 1, 0, 0, 1, 1, 0, 0, 0, 1, 1, 0, 0, 1, | 0, 1, 0, 0, 1, 1, 0, 0, 1 |
| 1, 1, 0, 1, 1 | 1, 1, 0, 1, 1, 1, 1, 1, 0, | 1, 1, 0, 1, 0, 1, 1, 0, 0, 1, 1, 0, 1, 0, 0, 1, 1, | 0, 0, 1, 0, 0, 1, 1, 0, 0 |
| 1, 1, 1, 0, 0 | 1, 1, 1, 0, 0, 1, 1, 1, 0, | 0, 0, 0, 0, 1, 1, 1, 1, 1, 0, 0, 0, 0, 0, 0, 0, 0, 1, | 1, 1, 0, 0, 0, 0, 1, 1, 1 |
| 1, 1, 1, 0, 1 | 1, 1, 1, 0, 1, 1, 0, 1, 1, | 0, 1, 0, 1, 1, 0, 1, 0, 1, 1, 0, 1, 0, 1, 0, 1, 0, 0, | 1, 0, 1, 0, 1, 0, 0, 1, 0 |
| 1, 1, 1, 1, 0 | 1, 1, 1, 1, 0, 0, 1, 1, 1, | 1, 0, 0, 1, 1, 0, 0, 1, 1, 1, 1, 0, 0, 1, 1, 0, 0, 0, | 0, 1, 1, 1, 0, 0, 0, 0, 1 |
| 1, 1, 1, 1, 1 | 1, 1, 1, 1, 1, 0, 0, 1, 0, | 1, 1, 0, 0, 1, 1, 0, 0, 1, 0, 1, 1, 0, 0, 1, 1, 0, 1, | 0, 0, 0, 1, 1, 0, 1, 0, 0 |

The performance when using these codes was evaluated by testing using the same assumptions given above before. Link level results are summarised in Table 7 below.

TABLE 7

| | TFCI Code | TFCI Error Rate | FER | FER + TFCI Error Rate | Triggered Loss |
|---|---|---|---|---|---|
| 1 bit TFCI | TFCI 1/8 | 3.95 | 10.11 | 10.13 | 0.02 |
| | Middle 4 bits TFCI 1/8 | 2.30 | 10.59 | 10.59 | 0.00 |
| 2 bits TFCI | TFCI 2/16 | 4.67 | 10.48 | 10.50 | 0.02 |
| | Middle 8 bits TFCI 2/16 | 2.30 | 10.59 | 10.59 | 0.00 |
| 3 bits TFCI | TFCI 3/24 | 5.26 | 10.40 | 10.42 | 0.02 |
| | Middle 12 bits TFCI 3/24 | 2.28 | 11.03 | 11.03 | 0.00 |
| 4 bits TFCI | TFCI 4/28 | 6.04 | 10.56 | 10.58 | 0.02 |
| | Middle 14 bits TFCI 4/28 | 3.08 | 11.17 | 11.17 | 0.00 |
| 5 bits TFCI | TFCI 5/36 | 6.66 | 10.77 | 10.82 | 0.05 |
| | Middle 18 bits TFCI 5/36 | 2.93 | 12.01 | 12.01 | 0.00 |

It can be seen that the additional loss when using for half-rate channels the middle segment of the full-rate codes is so small as to be insignificant, meaning that the reduced coding of the TFCI does not imply additional loss of frames. The FER performance is significantly improved compared to using the full-rate codes, as a result of the increased payload of the content data bits. The FER is improved by 0.5 dB for the 1 bit TFCIs, by 0.1 dB for the 2 bits TFCIs, by 0.6 dB for the 3 bits TFCIs, by 0.6 dB for the 4 bits TFCIs, and by 1.2 dB for the 5 bits TFCI. The amount of coded TFCI data gives rise to a ratio of the performance of the coding of the transport format combination data to the performance of the coded content data which is at a similar level to the ratio in the full-rate mode.

In summary, included in a radio packet is coded transport format combination data constituting a part less than the whole of a code selected from the group of codes used for full-rate channels. Each reduced code consists of a segment having half the length of the code used for full-rate channels, and is taken from the middle of the relevant code.

Although the embodiment uses GMSK channels, it will be appreciated that the invention is applicable also to signals modulated using other modulation techniques, such as for example 8PSK. Furthermore, other codes may be used to represent transport format combination data, although the performance may vary if different codes are used. The channels on which the shorter codes are used may be quarter rate channels, or take any other suitable rate. The amount of the code that needs to be taken to provide acceptable performance levels depends on the properties of the codes and on the ratio of the bit rate of the channel to the bit rate of a full-rate channel.

The invention claimed is:

1. An apparatus comprising a radio transmitter device in which data indicating a transport format combination is coded and combined with content data for incorporation in a radio packet, the apparatus comprising: a controller, a memory, and a program stored in the memory, wherein the controller is configured on the basis of the program: to store plural codes as a set of codes, each of said plural codes in said set of codes relating to and identifying respective corresponding transport format combination data to each of said plural codes in said set of codes having more bits than said corresponding transport format combination data, wherein each code in said set of codes is constituted by a first number of bits and wherein each code in said set of codes has the same number of bits as each other code in said set of codes: to operate in a full-rate channel mode, and to include in a radio packet when operating in the full-rate channel mode all of the first number of bits comprising one of said plural codes, and to operate in a second mode in which data is transmitted on a channel at a transmission rate that is lower than a transmission rate of the full-rate channel mode, and to include in a radio packet when operating in the second mode, a part of one of said codes, wherein said part of said one of said codes comprises a second number of bits, wherein the second number of bits is less than the first number of bits, and to refrain from transmitting bits of the said one of said plural codes other than said first number of bits comprising one of said plural codes.

2. The apparatus as claimed in claim 1, including a flexible layer one.

3. The apparatus as claimed in claim 1, in which the second number of bits is equal to the first number of bits in the full-rate code multiplied by the ratio of a bit rate of the channel of the second mode to a bit rate of the full-rate channel.

4. The apparatus as claimed in claim 1, in which the coded transport format combination data for the second mode channel forms a central segment of one of said code in said set.

5. The apparatus as claimed in claim 1, comprising an interleaver for interleaving the coded transport format combination data with the coded content data.

6. A mobile telephone comprising the apparatus as claimed in claim 1.

7. A base transceiver station comprising the apparatus as claimed in claim 1.

8. An apparatus comprising a radio transmitter device in which data indicating a transport format combination is coded and combined with content data for incorporation in a radio packet, the apparatus comprising:

a controller, a memory, and a program stored in the memory, wherein the controller is configured on the basis of the program:

to operate in a full-range channel mode, the apparatus being configured to include in a radio packet, when operating in said full-rate channel mode, a first number of bits of coded transport format combination data, wherein the first number of bits of coded transport format combination data gives rise to a first ratio of a the performance of the coding of the transport format combination data to a performance of the coded content data; and to operate in a second channel mode, wherein data is transmitted in said second channel mode at a transmission rate lower than a transmission rate of said full-rate channel mode, and to include in a radio packet when operating in said second mode a second number of bits of coded transport format combination data, the second number of bits of coded transport format combination data being less than the first number of bits of coded transport format combination data, wherein the second number of bits of coded transport format combination data gives rise to a second ratio of a the performance of the coding of the transport format combination data to a performance of the coded content data, wherein said first ratio of performance of the coding of the transport format combination data to performance of the coded content data is the same as said second ratio of performance of the coding of the transport format combination data to performance of the coded content data.

9. The apparatus as claimed in claim 8, including a flexible layer one.

10. A base transceiver station comprising the apparatus as claimed in claim 8.

11. A mobile telephone comprising the apparatus as claimed in claim 8.

12. The apparatus as claimed in claim 8, comprising an interleaver for interleaving the coded transport format combination data with the coded content data.

* * * * *